(12) United States Patent
Rinetti et al.

(10) Patent No.: US 9,688,216 B1
(45) Date of Patent: Jun. 27, 2017

(54) TRUCK CHAPS SYSTEMS

(71) Applicants: Mark Rinetti, Livermore, CA (US); Diane Rinetti, Livermore, CA (US)

(72) Inventors: Mark Rinetti, Livermore, CA (US); Diane Rinetti, Livermore, CA (US)

( * ) Notice: Subject to any disclaimer, the term of this patent is extended or adjusted under 35 U.S.C. 154(b) by 0 days.

(21) Appl. No.: 14/860,013

(22) Filed: Sep. 21, 2015

(51) Int. Cl.
*B60R 13/01* (2006.01)
*B62D 65/02* (2006.01)
*B65G 67/04* (2006.01)

(52) U.S. Cl.
CPC ............ *B60R 13/01* (2013.01); *B62D 65/024* (2013.01); *B65G 67/04* (2013.01)

(58) Field of Classification Search
CPC .................. B01J 19/246; B01J 19/2465; B01J 2219/00094; B60R 13/01; B60R 13/04
USPC ..... 293/39.2, 100.1, 100.11, 100.16, 136.01, 293/136.03, 136.1; 298/128; 180/209, 180/232
See application file for complete search history.

(56) References Cited

U.S. PATENT DOCUMENTS

| | | | |
|---|---|---|---|
| 4,531,560 A | 4/1985 | Balanky | |
| 4,884,824 A | 12/1989 | Radke | |
| 4,997,227 A | 3/1991 | Falzone | |
| 5,636,883 A | 6/1997 | Johns | |
| 5,641,179 A | 6/1997 | Imlach | |
| 5,938,263 A * | 8/1999 | Barthelman | B60J 11/06 296/37.6 |
| 6,073,964 A | 6/2000 | Smith | |
| 6,109,655 A * | 8/2000 | Wheeler | B60J 11/06 280/154 |
| 6,296,279 B1 * | 10/2001 | Stoddard | B60J 11/06 280/770 |
| 6,527,318 B2 * | 3/2003 | Kolper | B60P 7/0876 293/116 |
| 6,702,344 B2 * | 3/2004 | Belli | B60J 11/025 280/770 |
| 7,866,715 B2 * | 1/2011 | Malina | B60R 19/44 293/117 |

* cited by examiner

*Primary Examiner* — Glenn Dayoan
*Assistant Examiner* — Sunsurraye Westbrook
(74) *Attorney, Agent, or Firm* — Integrity Patent Group, PLC; Edwin Wold

(57) ABSTRACT

First-truck-chap-assembly and second-truck-chap-assembly are removeably coupleable with the first-truck-bed-side and the second-truck-bed-side, respectively, such that the first-truck-chap-assembly and the second-truck-chap-assembly are able to be moved in relation to a truck-bed-box to protect the truck-bed-box from damage and to prevent contents, when filled, in the truck-bed-box from displacement.

12 Claims, 5 Drawing Sheets

TRUCK CHAPS SYSTEMS

CROSS-REFERENCE TO RELATED APPLICATION

The present application is related to and claims priority from prior provisional application Ser. No. 62/065,653, filed Oct. 18, 2014 which application is incorporated herein by reference.

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of vehicle body protectors and more specifically relates to a truck chaps system.

2. Description of Related Art

A vehicle may be at least the second largest purchase that most individuals will make in their lifetime. Because of this, a vehicle, especially a new one, is an investment. Most modern people consider owning a vehicle as a necessity because of commuting distances. A vehicle has to provide at least a certain amount of service to be cost effective, and then preferably be in good re-sell or trade in condition to reduce the out-of-pocket cost when the time comes to buy a new vehicle. Scratches and dents in the body of a vehicle mar the appearance and therefore will reduce the value of the trade in or sale price.

On a pickup, the bed sides and tailgate generally show the most marks and damage from normal wear and tear. Unfortunately, when a vehicle gets well used by the owner, the signs of wear and tear are obvious on the exterior of the body. In addition, body damage can also enable the rusting process to commence which can structurally affect the vehicle. A well-used vehicle provides a valued service to the owner. Many times owners like to haul contents within the confines of the truck bed. Wind caused during travel, may cause contents to fly out. This is not desirable. A need exists for an invention that can prolong the higher values of a vehicle because of preserved aesthetic appearance despite the vehicle being well used.

Several attempts have been made to solve the above-mentioned problems such as those found in U.S. Pat. No. 4,531,560 to Michael F. Balanky; U.S. Pat. No. 4,884,824 to Percy B. Radke; U.S. Pat. No. 4,997,227 to Thomas C. Falzone; U.S. Pat. No. 5,636,883 to Jesse A. Johns; U.S. Pat. No. 5,641,179 to Alan G. Imlach; and U.S. Pat. No. 6,073,964 to Daniel J. Smith. This prior art is representative of truck body protecting means. However, none of the above inventions and patents, taken either singly or in combination, is seen to describe the invention as claimed.

Preferably, a truck chaps system should provide protection for truck beds and bed box sides as well as be useful for containing truck bed contents and, yet would operate reliably and be manufactured at a modest expense. Thus, a need exists for a reliable truck chaps system to reduce the normal wear and tear that occurs to pick up trucks when used for work such that maximum re-sale value may be realized. The present invention must be able to be multi-functional as a 'tarping' means to avoid the above-mentioned problems.

BRIEF SUMMARY OF THE INVENTION

In view of the foregoing disadvantages inherent in the known truck accessory art, the present invention provides a novel truck chaps system. The general purpose of the present invention, which will be described subsequently in greater detail, is to provide protection for truck beds and truck bed box sides as well be useful for containing truck bed contents when hauled.

The present invention serves to reduce damage that may occur during work processes such that re-sale value and cosmetic appearance may be maintained throughout the lifetime of the vehicle. Further, the device is designed to provide a means for safely hauling cargo in a 'wrapped' condition. As designed, the present invention may also serve as a bed protector for moving furniture and other such applications.

A truck chap system is disclosed herein, in a preferred embodiment, comprising: a first-truck-chap-assembly and second-truck-chap-assembly; the first-truck-chap-assembly comprising a first-flexible-body (having a first-front-surface, a first-back-surface, a first -edge, a second-edge, a third-edge, and a fourth-edge, a first-edge-support-member, a first -hook-and-loop-fastener-strips, and at least one first-fastener.) A second-truck-chap-assembly comprising a second-flexible-body (having a second-front-surface, a second-back-surface, a first-side, a second-side, a third-side, and a fourth-side, a first-side-support-member, second -hook-and-loop-fastener-strip, and at least one second-fastener.) The truck chap system comprises the first-truck-chap-assembly and the second-truck-chap-assembly in functional combination.

The first-truck-chap-assembly comprises the first-flexible-body and the at least one first-fastener; the at least one first-fastener structured and arranged to couple the first -flexible-body to a first-truck-bed-side. The first-truck-chap-assembly comprises at least one durable fabric, in preferred embodiments, to form the first-flexible-body, wherein the first -flexible-body is defined by the first-front-surface, the first-back-surface, the first-edge, the second-edge, the third-edge, and the fourth-edge. The second-truck-chap-assembly comprises the second-flexible-body and the at least one second-fastener; the at least one second-fastener structured and arranged to couple the second-flexible-body to a second-truck-bed-side (such that the second-truck-bed-side is located opposing the first-truck-bed-side for use.) The second-truck-chap-assembly comprises at least one durable fabric to form the second -flexible-body, wherein the second-flexible-body is defined by the second-front-surface, the second-back-surface, the first-side, the second-side, the third-side, and the fourth-side.

The first-flexible-body and the second-flexible-body when coupled comprise a securable wrapping means. The first-truck-chap-assembly and the second-truck-chap -assembly are removeably coupleable with the first-truck-bed-side and the second-truck-bed -side respectively. As such the first-truck-chap-assembly and the second-truck-chap-assembly are able to be moved in relation to a truck-bed-box to protect the truck-bed-box from damage and to prevent contents, when filled, in the truck-bed-box from displacement.

When using the first-truck-chap-assembly and the second-truck-chap-assembly the user may drape the first-truck-chap-assembly over the first-truck-bed-side, drape the second-truck-chap-assembly over the second-truck-bed-side and load contents into a truck-bed-box thus preventing the sides of the truck-box from getting scratched or dinged. The first-truck-chap-assembly may be coupled to the second-truck-chap-assembly to retain the contents within the truck-bed-box. When it is desired to remove the contents the first-truck-chap-assembly and the second-truck-chap-assembly are uncoupled from each other. The first-truck-chap-assembly and the second-truck-chap-assembly may be uncoupled from their respective truck-bed-sides. Further, the truck-chap-assemblies may be laid flat in the bed such that children can play in the box or items can be loaded on top of the chaps to prevent scratching of the bottom of the bed.

A kit is also disclosed herein including: the first-truck-chap-assembly, the second-truck-chap-assembly, clamping brackets, and a set of user instructions. Specialty clamping brackets may be used wherein no drilling needs to take place. Alternately, brackets may be affixed to the truck as desired. A method of using the truck chap system is also described comprising the steps of: installing a first-truck-chap-assembly to a first interior position on a first-truck-bed-side, installing a second-truck-chap-assembly to a second interior position on a second-truck-bed-side, draping the first-truck-chap-assembly over the first-truck-bed-side, draping the second-truck-chap-assembly over the second-truck-bed-side, loading contents into a truck-bed-box, and coupling the first-truck-chap-assembly to the second-truck-chap-assembly to retain the contents within the truck-bed-box when traveling. An optional step of wrapping the first-truck-chap-assembly to the second-truck-chap-assembly via securing means may also be included. The assemblies may be uncoupled from the box and put in storage for future uses when project is completed.

The present invention holds significant improvements and serves as a truck chaps system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, truck chap systems, constructed and operative according to the teachings of the present invention.

The various embodiments of the present invention will hereinafter be described in conjunction with the appended drawings, wherein like designations denote like elements.

DETAILED DESCRIPTION

Figure 1:
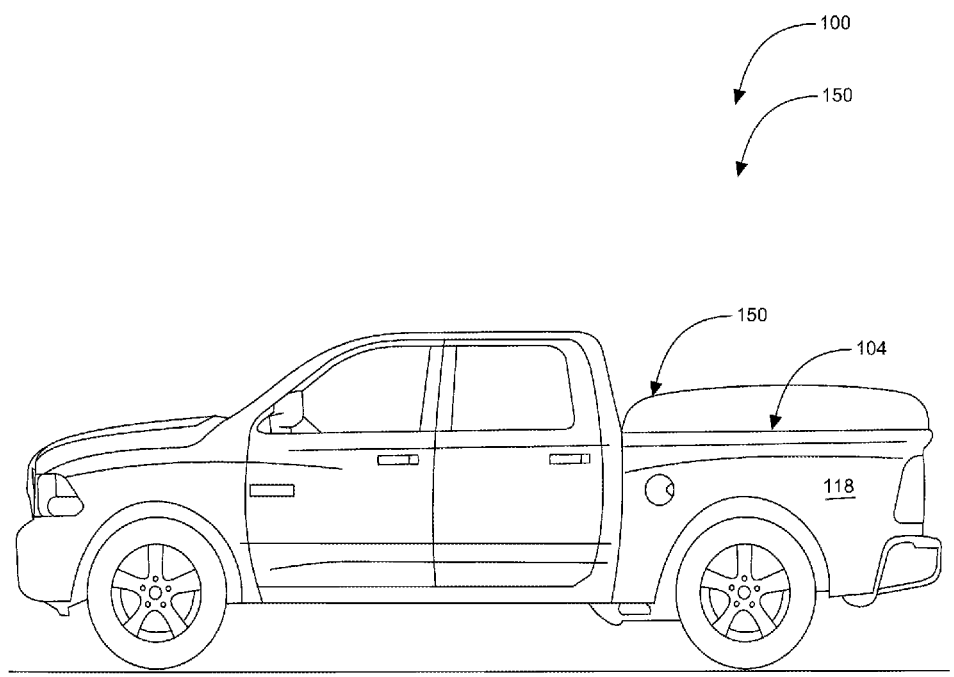
FIG. 1 shows a perspective view illustrating truck chap systems during an 'in-use' condition according to an embodiment of the present invention.
Figure 2:
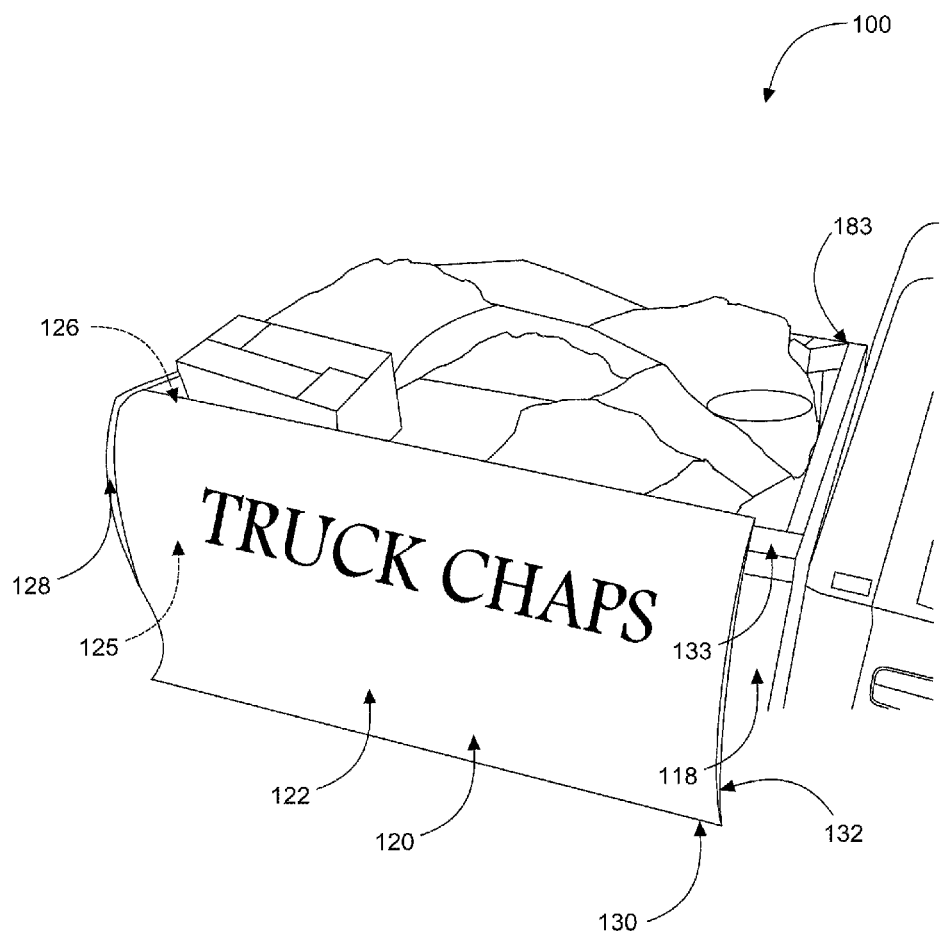
FIG. 2 is a perspective view illustrating a ready-for-use condition of the truck chaps system according to an embodiment of the present invention of FIG. 1.
Figure 3:
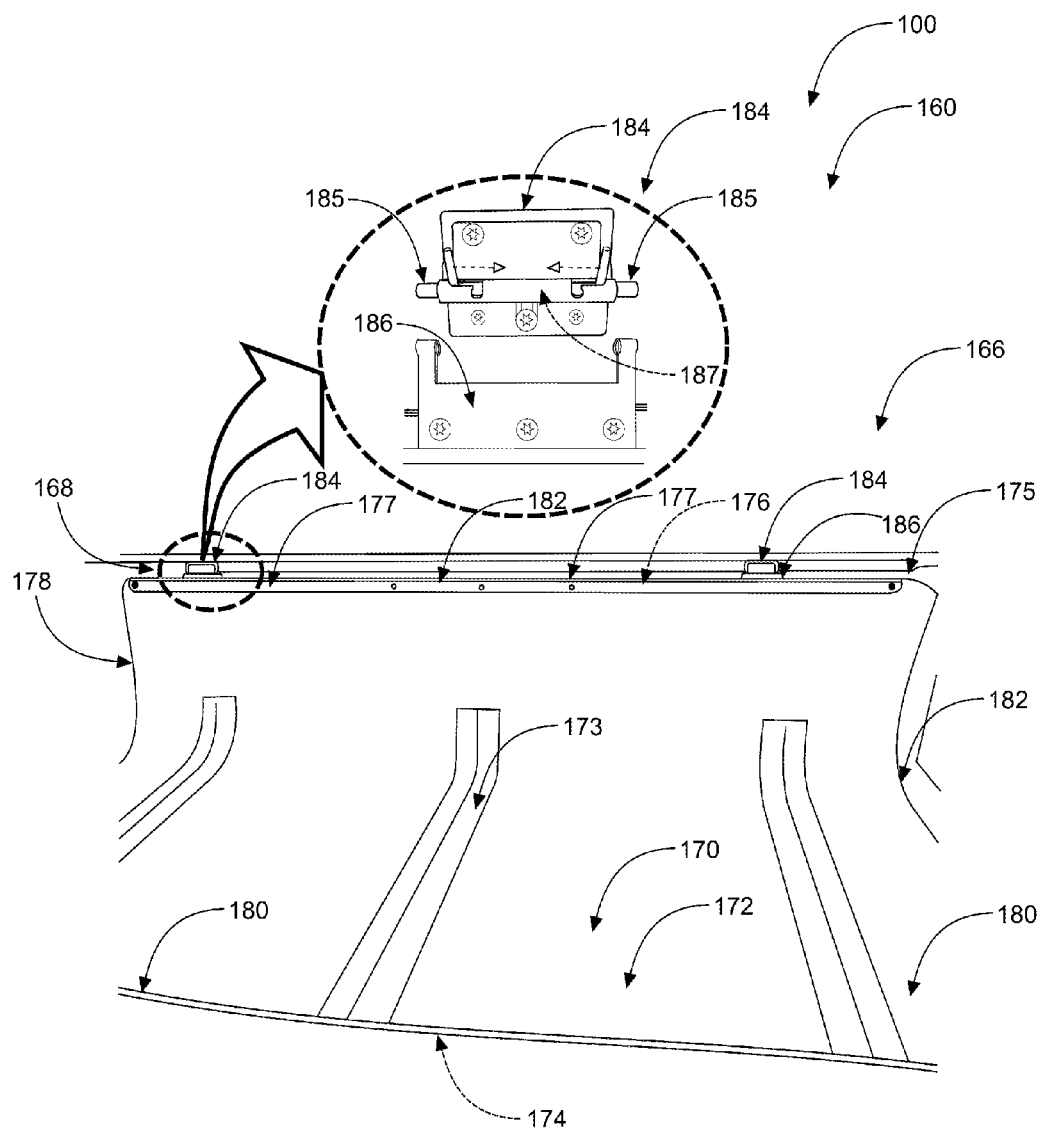
FIG. 3 is a perspective view illustrating the truck chaps assemblies deployed to protect the box of a pickup truck according to an embodiment of the present invention of FIGS. 1-2.
Figure 4:
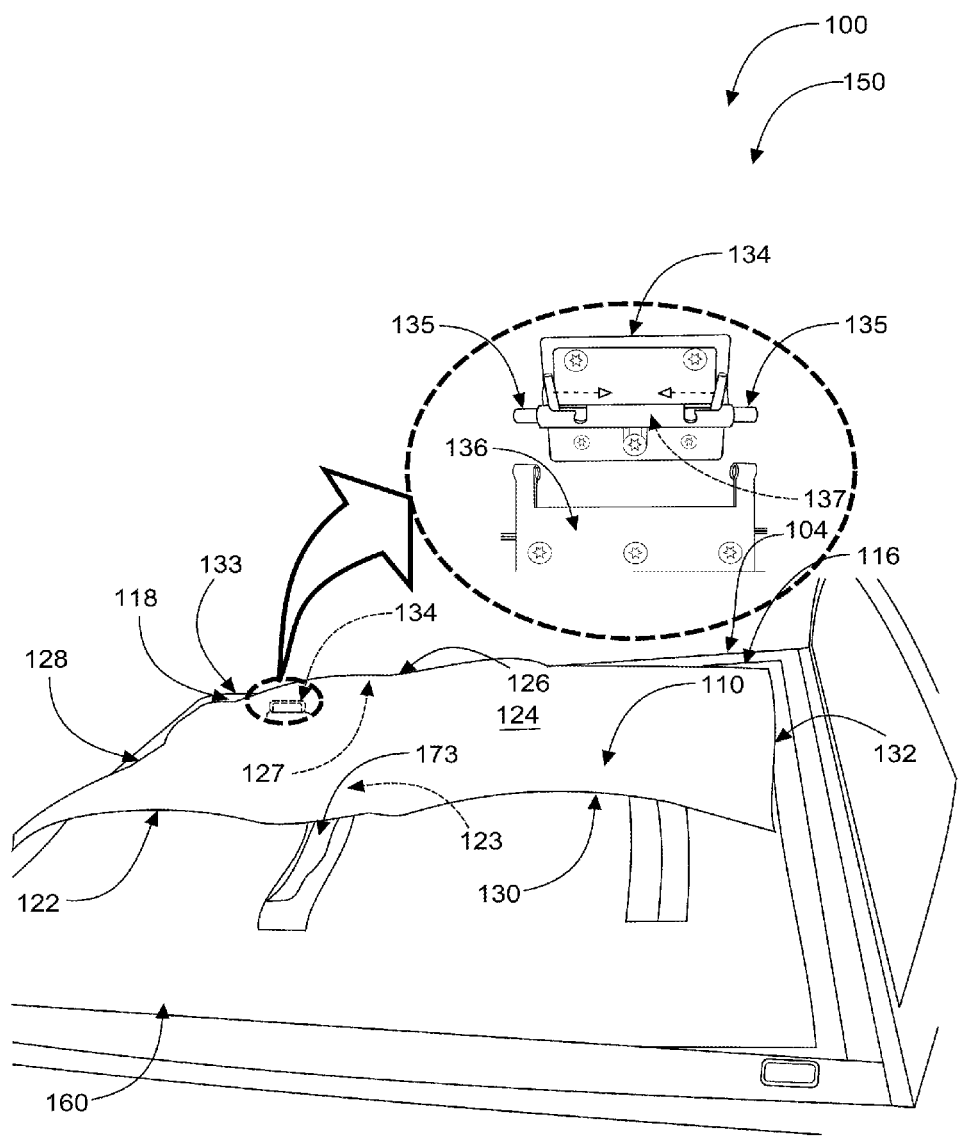
FIG. 4 is a perspective view illustrating the truck chap systems according to an embodiment of the present invention of FIGS. 1-3.

As discussed above, embodiments of the present invention relate to vehicle body protectors and more particularly to a truck chap system as used to improve the road safety while traveling with a loaded truck bed box as well as preserving the aesthetic appearance and resale value of a vehicle.

Generally speaking, the truck chaps system preferably comprises a heavy fabric having stiffeners that sandwich the top edges of the fabric and hinge to the inside edges of both sides of a pickup bed. The fabric, after being hinged to the bed, can then be flipped over the top edges of the bed to the outside to cover both sides of the body and protect it from scratches and minor dents from falling or rubbing objects while loading the bed with trash, furniture, dirt, gravel, or other such materials. The truck chaps remain in a stowed position when it is desirable to keep the truck chaps with the truck. This renders the present invention as multi-purpose.

The chaps can be easily and quickly uncoupled for storing somewhere other than the truck if desired. The truck bed box load may be ready to be secured and hauled to a second location, such as a dump. The chaps are preferably attached to the inside edges of the pickup bed, and may be flipped over the load on the inside of the bed to cover the load and keep debris from flying out of the truck at highway speeds. Each chap preferably has hook-and-loop fasteners (or other suitable fastening means) such that the load can be completely secured. Additionally, the material is a heavy gauge fabric that adds weight to the top of the load to further secure the load. The chaps can also be laid flat in the bed of the truck such that it provides a soft cover for infants to play on or onto which delicate objects can be placed.

The hinge mechanism may comprise two plates and the spring loaded hinge bolt handles. Preferably, the plates are made of aluminum to keep the mechanism lightweight. The plates first and second plates are designed to sandwich the inside vertical edge of each side of the pickup bed with preferably two hinges per side. The second plate has a notch designed to catch the bottom edge of the bed. All pickup truck beds have a slight lip that curves outwardly away from the inside of the bed. Fasteners pass through the first plate and thread into the second plate to clamp the two plates together with the outwardly curving bottom lip of the bed caught between the inside notch of the second plate and the inside surface of first plate. The advantage in this system is that the hinges can be installed and adjusted in width without having to drill the truck bed. If preferred, the hinge portion can be removed from first plate and attached directly to the edge of the bed for a permanent installation. Certain alternate hinges may be used whereby clamping means may be used such that drilling is not needed into the truck box.

The two handles may be integral with the sliding bolts in the rolled portion of hinge. To attach the hinge portion that sandwiches the heavy fabric to hinge portion which is already attached to the inside edge of the pickup bed, the handles are squeezed together toward the middle so that the bolts slide into the housing, and then the two circular looped portions of hinge portion with the fabric attached is aligned with the bolts and then released. An inner spring located between bolts pushes the bolts apart (biasing in tension) toward the outside of the housing and into the two circular looped portions of hinge portion where the two hinge portions are able to freely rotate to either position the chap on the outside of the bed or over a load on the inside of the bed.

Referring to the drawings by numerals of reference there is shown in FIGS. 1-4, truck chap system 100 comprising first-truck-chap-assembly 110 comprising first-flexible-body 120 having (first-front-surface 122, first-back-surface 124, first-edge 126, second-edge 128, third-edge 130, fourth-edge 132; and at least one first-fastener 134); second-truck-chap-assembly 160 comprising second-flexible-body 170 having (second-front-surface 172, second-back-surface 174, first-side 176, second-side 178, third-side 180, fourth-side 182 and at least one second-fastener 184); wherein truck chap system 100 comprises first-truck-chap-assembly 110 and second-truck-chap-assembly 160 in functional combination.

First-truck-chap-assembly 110 comprises first-flexible-body 120; and at least one first-fastener 134; at least one first-fastener 134 structured and arranged to couple first-flexible-body 120 to first-truck-bed-side 125; wherein first-flexible-body 120 is defined by first-front-surface 122, first-back-surface 124, first-edge 126, second-edge 128, third-edge 130, and fourth-edge 132, In a similar manner second-truck-chap-assembly 160 comprises second-flexible-body 170; and at least one second-fastener 184; at least one second-fastener 184 structured and arranged to couple second-flexible-body 170 to second-truck-bed-side 175, as desired. Second-flexible-body 170 is defined by second-front-surface 172, second-back-surface 174; first-side 176, second-side 178, third-side 180, and fourth-side 182. First-truck-chap-assembly 110 and second-truck-chap-assembly 160 are removeably coupleable with first-truck-bed-side 125 and second-truck-bed-side 175, respectively, such that first-truck-chap-assembly 110 and second-truck-chap-assembly 160 are able to be moved in relation to a truck-bed-box 104 to protect truck-bed-box 104 from damage and to prevent contents, when filled, in truck-bed-box 104 from displacement. The present invention serves as a physical barrier to protect truck-bed-box 104.

First-truck-chap-assembly 110 comprises at least one fabric to form first-flexible-body 120. Second-truck-chap-assembly 160 comprises at least one fabric to form second-flexible-body 170. First-truck-chap-assembly 110 may comprise first-edge-support-member 127. Second-truck-chap-assembly 160 comprises second-side-support-member 177 (shown in FIG. 3). First-front-surface 122 comprises first-hook-and-loop-fastener-strips 123. Second-front-surface 172 comprises second-hook-and-loop-fastener-strip 173. Other fastening means may be employed.

First-flexible-body 120 and second-flexible-body 170, when coupled, comprise a securable wrapping means. First-flexible-body 120 is rotatable about the at least one first-fastener 134 such that it can occupy a position adjacent an exterior of first-truck-side 118 draped over first-truck-box-top-edge 133 to prevent damage. Second-flexible-body 170 is rotatable about the at least one second-fastener 184 such that it can occupy a position adjacent an exterior of the second-truck-side 168 draped over second-truck-box-top-edge 183 to prevent damage. In this way aesthetics of the vehicle are maintained.

At least one first-fastener 134 comprises at least one first-bolt-action-pin 135. At least one second-fastener 184 may comprise at least one second-bolt-action-pin 185. First-fastener 134 may comprise a two-part assembly including the at least one first-bolt-action-pin 135 and first-pin-mount-bracket 136. Second-fastener 184 also preferably comprises a two-part assembly including the at least one second-bolt-action-pin 185 and second-pin-mount-bracket 186. First-fastener 134 may further comprise first-spring-biaser 137 and second-fastener may further comprise second-spring-biaser 187 such that tensioning may be realized to promote ease of use. Various fastening, coupling and uncoupling means may be employed and fall within the scope of the present disclosure.

Truck chap system 100 may be sold as kit comprising the following parts: at least one first-truck-chap-assembly 110; at least one second-truck-chap-assembly 160; clamping brackets; and at least one set of user instructions. The kit has instructions such that functional relationships are detailed in relation to the structure of the invention (such that the invention can be used, maintained, or the like in a preferred manner). Truck chap system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
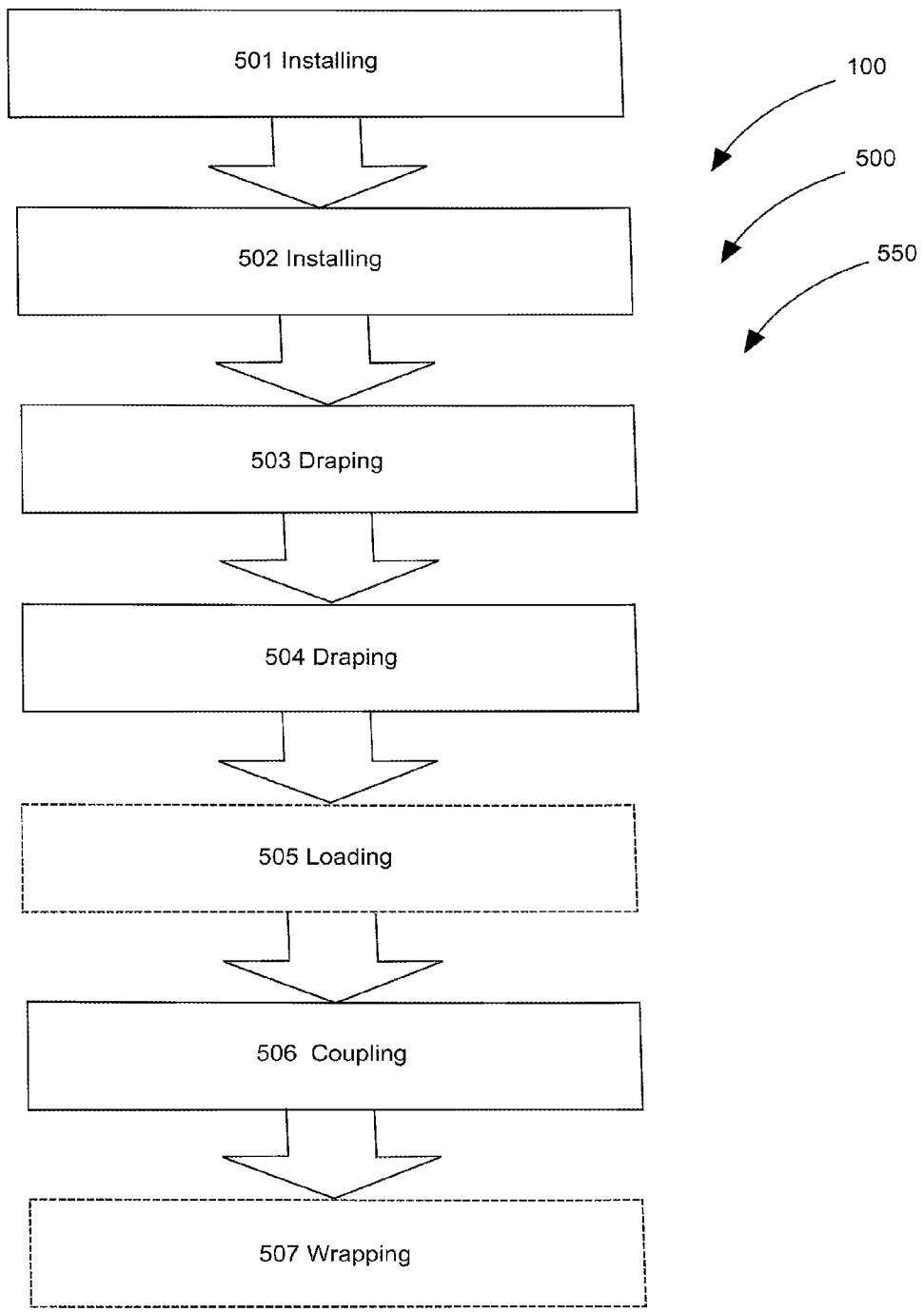
FIG. 5 is a method of use illustrating the truck chap system according to an embodiment of the present invention of FIGS. 1-4.

Referring now to FIG. 5 showing flowchart 550 illustrating method of use 500 for truck chap system 100 according to an embodiment of the present invention of FIGS. 1-4.

As shown, method of use 500 may comprise the steps of: step one 501, installing first-truck-chap-assembly 110 to first interior position 116 on first-truck-bed-side 125, step two 502, installing second-truck-chap-assembly 160 to second interior position 166 on second-truck-bed-side 175, step three 503 draping first-truck-chap-assembly 110 over first-truck-bed-side 125, step four 504 draping second-truck-chap-assembly 160 over second-truck-bed-side 175, step five 505 loading contents into truck-bed-box 104, and step six 506 coupling first-truck-chap-assembly 110 to second-truck-chap-assembly 160 to retain the contents within truck-bed-box 104 when traveling. The method 500 may further comprise the step seven 507 of wrapping first-truck-chap-assembly 110 to second-truck-chap-assembly 160 via securing means. It should be noted that steps 505 and 507 are optional steps and may not be implemented in all cases. Optional steps of method of use 500 are illustrated using dotted lines in FIG. 5 so as to distinguish them from the other steps of method of use 500.

It should be noted that the steps described in the method of use can be carried out in many different orders according to user preference. The use of "step of" should not be interpreted as "step for", in the claims herein and is not intended to invoke the provisions of 35 U.S.C. § 112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A truck chap system comprising:
   a) a first-truck-chap-assembly comprising:
      i) a first-flexible-body comprising:
         (1) a first-front-surface;
         (2) a first-back-surface;
         (3) a first-edge;
         (4) a second-edge;
         (5) a third-edge; and
         (6) a fourth-edge; and
      ii) at least one first-fastener-strip comprising:
         (a) first-hook-and-loop-fastener-strip;
      iii) at least one first hinge comprising:
         (1) a first-spring-loaded-hinge bolt handle;
         (2) a first-hinge plate;
         (3) a first-mating-hinge plate comprising:
            (a) a first catch-notch;
      iv) at least one first-stiffener;
   b) a second-truck-chap-assembly comprising:
      i) a second-flexible-body comprising:
         (1) a second-front-surface;
         (2) a second-back-surface;
         (3) a first-side;
         (4) a second-side;
         (5) a third-side; and
         (6) a fourth-side; and
      ii) at least one second-fastener-strip comprising:
         (a) a second-hook-and-loop-fastener-strip;
      iii) at least one second hinge comprising:
         (1) a second-spring-loaded-hinge bolt handle;
         (2) a second-hinge plate;
         (3) a second-mating-hinge plate comprising:
            (a) a second catch-notch;
      iv) at least one second-stiffener
   c) wherein said truck chap system comprises said first-truck-chap-assembly and said second-truck-chap-assembly in functional combination;
   d) wherein said first-flexible-body is functionally defined by said first-front-surface, said first-back-surface, said first-edge, said second-edge, said third-edge, and said fourth-edge of said first-flexible-body;
   e) wherein said second-flexible-body is functionally defined by said second-front-surface, said second-back-surface, said first-edge, said second-edge, said third-edge, and said fourth-edge of said second-flexible-body;
   h) wherein said first-flexible-body, excepting said at least one first-fastener-strip, is a mirror-image of said second-flexible body, excepting said at least one second-fastener-strip, when viewed from said first-front-surface and said second-front-surface;
   i) wherein said at least one first-fastener-strip is structured and arranged with said first-front-surface of said first-flexible-body and said at least one second-fastener-strip of said second-flexible-body is structured and arranged with said second-back-surface such that said at least one first-fastener-strip and said at least one second-fastener-strip are linearly-removably fastenable to each other, wherein said first-flexible-body is linearly-removeably fastenable to said second-flexible-body, whereby comprising a securable wrapping means when coupled, whereby wrapping a hauling cargo;
   k) wherein said at least one first-stiffener is structured and arranged with said at least one first-hinge and further structured and arranged with said first-flexible-body to form a sandwich structure with a first-side of a pickup bed;
   l) wherein said first-hinge plate and said first-mating-hinge plate plates are structured and arranged to sandwich-connect to a first-inside-vertical edge of the first-side of the pickup bed such that said first catch-notch of said first-mating-hinge plate catches at a first-lip that curves outwardly away from a first-bottom edge of the first-inside-vertical edge of the first-side of the pickup bed;
   m) wherein said at least second first-stiffener is structured and arranged with said at least one second-hinge and further structured and arranged with said second-flexible-body to form a sandwich structure with a second-side of the pickup bed;
   n) wherein said second-hinge plate and said second-mating-hinge plate plates are structured and arranged to sandwich-connect to a second-inside-vertical edge of the second-side of the pickup bed such that said second catch-notch of said second-mating-hinge plate catches at a second-lip that curves outwardly away from a second-bottom edge of the second-inside-vertical edge of the pickup bed;
   o) wherein said first-truck-chap-assembly and said second-truck-chap-assembly are removeably coupleable with the first-side of the pickup bed and the second-side of the pickup bed, respectively, such that said first-truck-chap-assembly and said second-truck-chap-assembly are structured and arranged to move in relation to a truck-bed-box whereby protecting said truck-bed-box from damage and preventing the hauling cargo from displacement.

2. The truck chap system of claim 1 wherein said first-truck-chap-assembly comprises at least one fabric to form said first-flexible-body.

3. The truck chap system of claim 1 wherein said second-truck-chap-assembly comprises at least one fabric to form said second-flexible-body.

4. The truck chap system of claim 1 wherein said first-truck-chap -assembly comprises at least two first-edge-support-members.

5. The truck chap system of claim 1 wherein said second-truck-chap -assembly comprises at least two first-side-support-members.

6. The truck chap system of claim 1 wherein said first-flexible-body and said second -flexible-body when coupled comprise a securable wrapping means.

7. The truck chap system of claim 1 wherein said first-flexible-body is rotatable about said at least one first-fastener-strip such that it can occupy a position adjacent an exterior of a first-truck-side draped over a first-truck-box-top-edge to prevent damage.

8. The truck chap system of claim 1 wherein said second-flexible-body is rotatable about said at least one second-fastener-strip such that it can occupy a position adjacent an exterior of a second-truck-side draped over a second-truck-box-top-edge to prevent damage.

9. A truck chap system comprising:
  e) a first-truck-chap-assembly comprising;
    i) a first-flexible-body comprising;
      (1) a first-front-surface;
      (2) a first-back-surface;
      (3) a first-edge;
      (4) a second-edge;
      (5) a third-edge; and
      (6) a fourth-edge; and
    ii) at least one first-fastener-strip comprising:
      (a) first-hook-and-loop-fastener-strip;
    iii) at least one first hinge comprising:
      (1) a first-spring-loaded-hinge bolt handle;
      (2) a first-hinge plate;
      (3) a first-mating-hinge plate comprising:
        (a) a first catch-notch;
    iv) at least one first-stiffener;
  f) a second-truck-chap-assembly comprising;
    i) a second-flexible-body comprising;
      (1) a second-front-surface;
      (2) a second-back-surface;
      (3) a first-side;
      (4) a second-side;
      (5) a third-side; and
      (6) a fourth-side; and
    ii) at least one second-fastener-strip comprising:
      (a) a second-hook-and-loop-fastener-strip;
    iii) at least one second hinge comprising:
      (4) a second-spring-loaded-hinge bolt handle;
      (5) a second-hinge plate;
      (6) a second-mating-hinge plate comprising:
        (a) a second catch-notch;
    iv) at least one second-stiffener
  g) wherein said truck chap system comprises said first-truck-chap-assembly and said second-truck-chap-assembly in functional combination;
  h) wherein said first-flexible-body is functionally defined by said first-front-surface, said first-back-surface, said first-edge, said second-edge, said third-edge, and said fourth-edge of said first-flexible-body;
  i) wherein said first-flexible-body, excepting said at least one first-fastener-strip, is a mirror-image of said second-flexible body, excepting said at least one second-fastener -strip, when viewed from said first-front-surface and said second-front-surface;
  j) wherein said at least one first-fastener-strip is structured and arranged with said first -front-surface of said first-flexible-body and said at least one second-fastener-strip of said second-flexible-body is structured and arranged with said second-back-surface such that said at least one first-fastener-strip and said at least one second-fastener-strip are linearly -removably fastenable to each other, wherein said first-flexible-body is linearly -removeably fastenable to said second-flexible-body, whereby comprising a securable wrapping means when coupled, whereby wrapping a hauling cargo;
  k) wherein said at least one first-stiffener is structured and arranged with said at least one first-hinge and further structured and arranged with said first-flexible-body to form a sandwich structure with a first-side of a pickup bed;
  l) wherein said first-hinge plate and said first-mating-hinge plate plates are structured and arranged to sandwich-connect to a first-inside-vertical edge of the first-side of the pickup bed such that said first catch-notch of said first-mating-hinge plate catches at a first-lip that curves outwardly away from a first-bottom edge of the first-inside-vertical edge of the first-side of the pickup bed;
  m) wherein said at least second first-stiffener is structured and arranged with said at least one second-hinge and further structured and arranged with said second-flexible-body to form a sandwich structure with a second-side of the pickup bed;
  n) wherein said second-hinge plate and said second-mating-hinge plate plates are structured and arranged to sandwich-connect to a second-inside-vertical edge of the second-side of the pickup bed such that said second catch-notch of said second-mating-hinge plate catches at a second-lip that curves outwardly away from a second-bottom edge of the second-inside-vertical edge of the pickup bed;
  o) wherein said first-truck-chap-assembly and said second-truck-chap-assembly are removeably coupleable with the first-side of the pickup bed and the second-side of the pickup bed, respectively, such that said first-truck-chap-assembly and said second-truck -chap-assembly are structured and arranged to move in relation to a truck-bed-box whereby protecting said truck-bed-box from damage and preventing the hauling cargo from displacement;
  p) wherein said first-truck-chap-assembly comprises at least one fabric to form said first -flexible-body;
  s) wherein said second-truck-chap-assembly comprises said at least one fabric to form said second-flexible-body.

10. The truck chap system of claim 9 further comprising a kit including:
  a) said first-truck-chap-assembly;
  b) said second-truck-chap-assembly;
  c) clamping brackets; and
  d) a set of user instructions.

11. A method of using the truck chap system of claim 9 comprising the steps of:
  a) installing said first-truck-chap-assembly to said first interior position on said first -truck-bed-side;
  b) installing said second-truck-chap-assembly to said second interior position on a said second-truck-bed-side;
  c) draping said first-truck-chap-assembly over said first-truck-bed-side;
  d) draping said second-truck-chap-assembly over said second-truck-bed-side;
  e) loading contents into a truck-bed-box; and
  f) coupling said first-truck-chap-assembly to said second-truck-chap-assembly to
  g) retain said contents within said truck-bed-box when traveling.

12. The method of claim 11 further comprising the step of wrapping said first-truck -chap-assembly to said second-truck-chap-assembly via securing means.

* * * * *